United States Patent [19]

Nakatani et al.

[11] Patent Number: 4,870,569
[45] Date of Patent: Sep. 26, 1989

[54] VECTOR ACCESS CONTROL SYSTEM

[75] Inventors: Shoji Nakatani; Kazushi Sakamoto, both of Kawasaki, Japan

[73] Assignee: Fujitsu Limited, Kawasaki, Japan

[21] Appl. No.: 929,818

[22] Filed: Nov. 13, 1986

[30] Foreign Application Priority Data

Nov. 15, 1985 [JP] Japan ............................ 60-256422

[51] Int. Cl.[4] .......................... G06F 9/18; G06F 12/06
[52] U.S. Cl. .................................................. 364/200
[58] Field of Search ... 364/200 MS File, 900 MS File/

[56] References Cited

U.S. PATENT DOCUMENTS

| | | | |
|---|---|---|---|
| 4,028,663 | 6/1977 | Royer et al. | 340/172.5 |
| 4,435,765 | 3/1984 | Uchida et al. | 364/200 |
| 4,441,153 | 4/1984 | Bullions, III et al. | 364/200 |
| 4,541,046 | 9/1985 | Nagashima et al. | 364/200 |
| 4,638,429 | 1/1987 | Watabe et al. | 364/200 |
| 4,639,862 | 11/1987 | Wada et al. | 364/200 |
| 4,644,467 | 2/1987 | McCarthy | 364/200 |
| 4,648,065 | 3/1987 | Zenk et al. | 364/900 |
| 4,661,900 | 4/1987 | Chen et al. | 364/200 |
| 4,665,479 | 5/1987 | Oinaga | 364/200 |
| 4,680,730 | 7/1987 | Omoda et al. | 364/200 |
| 4,697,235 | 9/1987 | Motegi | 364/200 |
| 4,733,344 | 3/1988 | Watanabe et al. | 364/200 |
| 4,745,545 | 5/1988 | Schiffleger | 364/200 |
| 4,760,545 | 7/1988 | Inagami et al. | 364/736 |

*Primary Examiner*—Gareth D. Shaw
*Assistant Examiner*—Viet Nguyen
*Attorney, Agent, or Firm*—Staas & Halsey

[57] ABSTRACT

A vector access control system for a computer system is provided, including vector registers and a memory access pipeline function unit having an indirect address match checking circuit for detecting a coincidence between data of elements accessed by a plurality of indirect address data. An access to a main storage is carried out by adding a plurality of data, which are read from the vector registers and are necessary for an indirect address access, to a leading address. When a coincidence of data of elements and a resultant conflict between access requests to the main storage is detected by the indirect address match checking circuit, only a predetermined access request in the conflicting access requests is allowed.

5 Claims, 9 Drawing Sheets

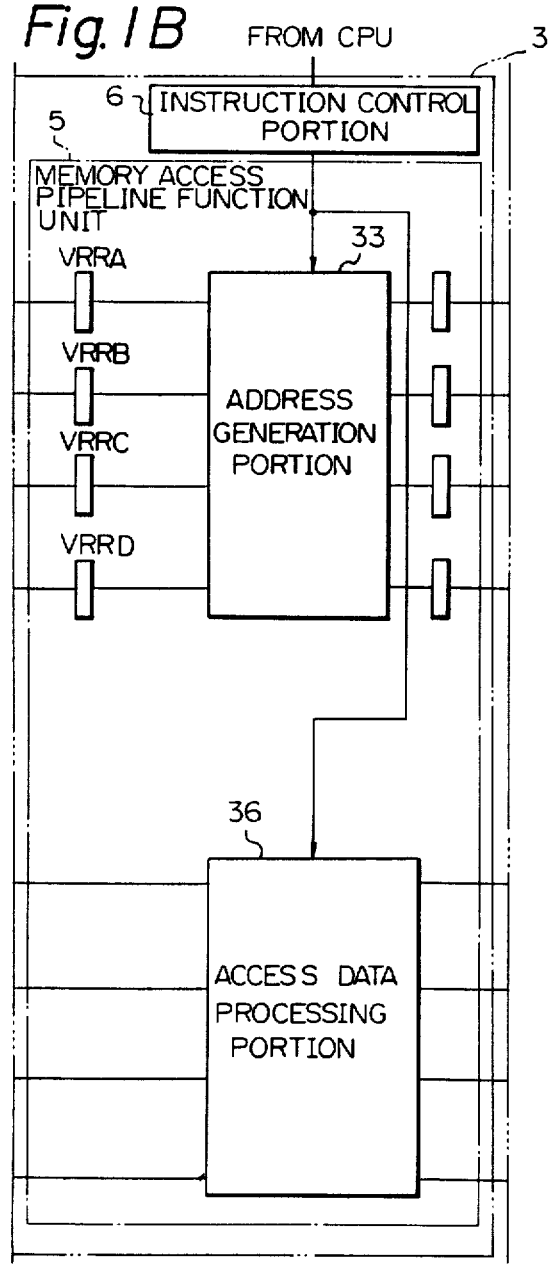

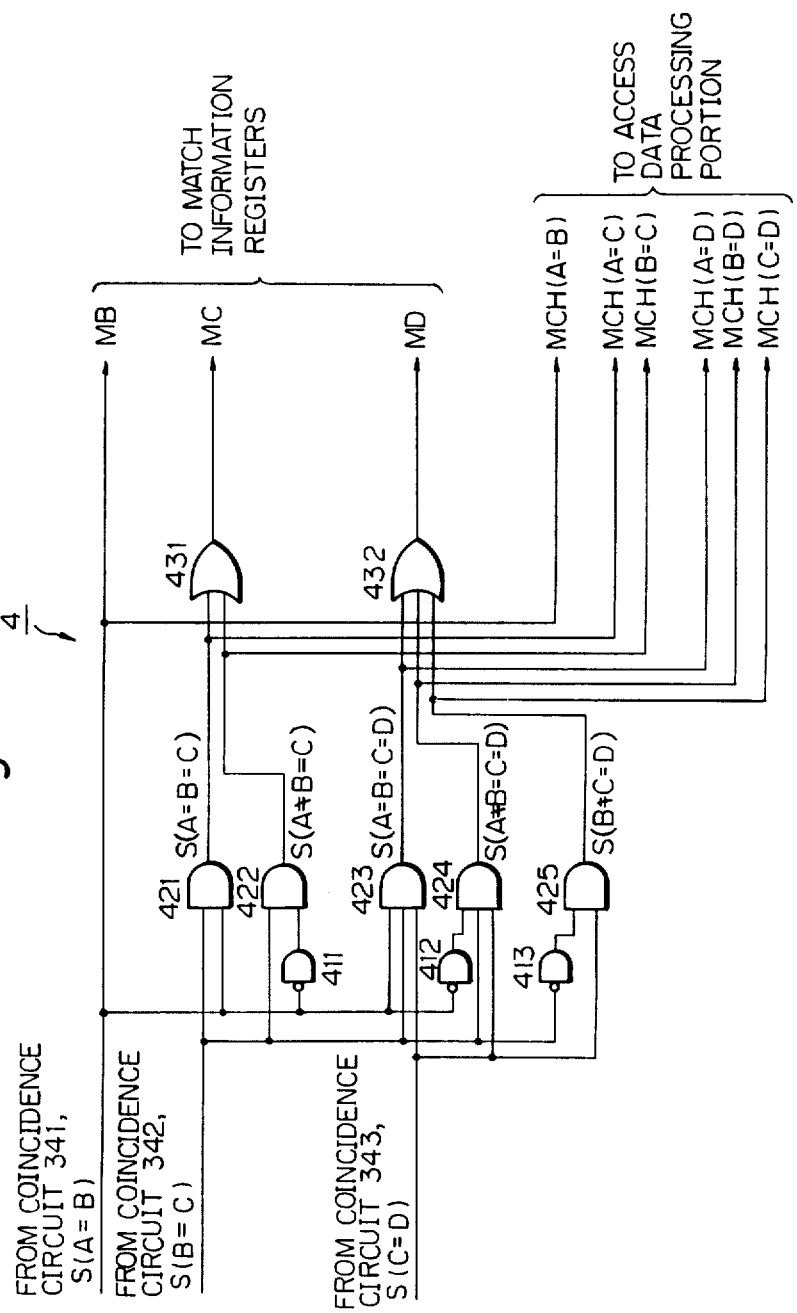

Fig. 5

PROHIBITION CONDITION
OF PRIORITY CONTROL CIRCUIT
BY ADDRESS MATCH INFORMATION

| ADDRESS MATCH INFORMATION | "LOAD" CASE | "STORE" CASE |
|---|---|---|
| MB IS ON | PROHIBIT PB REQUEST | PROHIBIT PA REQUEST |
| MC IS ON | PROHIBIT PC REQUEST | PROHIBIT PB REQUEST |
| MD IS ON | PROHIBIT PD REQUEST | PROHIBIT PC REQUEST |

Fig. 6

| TIMING | STATE OF READING REG. VRRA~VRRD | ELEMENT NUMBER | RESULT OF MATCH CHECK | PROCESSING IN ACCESS DATA PROCESSING PORTION (LOAD ACCESS) | PROCESSING IN ACCESS DATA PROCESSING PORTION (STORE ACCESS) |
|---|---|---|---|---|---|
| 1 | a₀ (VRRA) | 0 | — | USUAL ACCESS. | DATA OF ELEMENT No. 0 IS NOT WRITTEN INTO MEMORY |
| | a₀ (VRRB) | 1 | MB (A=B) | NO ACCESS. LOAD DATA OF ELEMENT No. 0 | DATA OF ELEMENT No. 1 IS WRITTEN INTO MEMORY |
| | a₁ (VRRC) | 2 | — | USUAL ACCESS. | DATA OF ELEMENT No. 2 IS NOT WRITTEN INTO MEMORY |
| | a₁ (VRRD) | 3 | MD(B≠C=D) | NO ACCESS. LOAD DATA OF ELEMENT No. 2 | DATA OF ELEMENT No. 3 IS WRITTEN INTO MEMORY |
| 2 | a₁ (VRRA) | 4 | — | USUAL ACCESS. | DATA OF ELEMENT No. 4 IS WRITTEN INTO MEMORY |
| | a₂ (VRRB) | 5 | — | USUAL ACCESS. | DATA OF ELEMENT No. 5 IS NOT WRITTEN INTO MEMORY |
| | a₂ (VRRC) | 6 | MC (A≠B=C) | NO ACCESS. LOAD DATA OF ELEMENT No. 5 | DATA OF ELEMENT No. 6 IS NOT WRITTEN INTO MEMORY |
| | a₂ (VRRD) | 7 | MD(A≠B=C=D) | NO ACCESS. LOAD DATA OF ELEMENT No. 5 | DATA OF ELEMENT No. 7 IS WRITTEN INTO MEMORY |
| 3 | a₃ (VRRA) | 8 | — | USUAL ACCESS. | DATA OF ELEMENT No. 8 IS NOT WRITTEN INTO MEMORY |
| | a₃ (VRRB) | 9 | MB (A=B) | NO ACCESS. LOAD DATA OF ELEMENT No. 8 | DATA OF ELEMENT No. 9 IS NOT WRITTEN INTO MEMORY |
| | a₃ (VRRC) | 10 | MC (A=B=C) | NO ACCESS. LOAD DATA OF ELEMENT No. 8 | DATA OF ELEMENT No. 10 IS NOT WRITTEN INTO MEMORY |
| | a₃ (VRRD) | 11 | MD(A=B=C=D) | NO ACCESS. LOAD DATA OF ELEMENT No. 8 | DATA OF ELEMENT No. 11 IS WRITTEN INTO MEMORY |

VECTOR ACCESS CONTROL SYSTEM

BACKGROUND OF THE INVENTION

The present invention relates to a vector access control system for a computer system. The system according to the present invention is used, for example, for controlling the access to vector data in a main storage relating to a vector unit in a supercomputer system.

A method of indirect address access has been used in a vector unit in a computer system where an access to a main storage is carried out by the designation of an index address for a leading address (or a base address). Generally, the main storage has a bank structure consisting of a plurality of banks, to increase the access speed, and accordingly, a plurality of data buses are connected with the main storage.

Indirect address data are read, per unit of plural sets of indirect address data, from the vector register, and a target address is produced by adding the read indirect address data to the leading address. The produced target address signal is then applied to the main storage so that the access processing is carried out.

For a "load" access operation, vector data are read in parallel from the banks of the main storage, by using the above-mentioned plural target addresses, and for a "store" access operation, vector data are written in parallel into the banks of the main storage, by using the above-mentioned plural target addresses.

It is assumed that vector data access requests with the indirect address method are simultaneously carried out by using a plurality of indirect addresses, for example, 4 indirect addresses, with respect to a main storage having a bank structure of, for example, 256 banks. If vector data are located at random in the main storage, a situation can occur in which a plurality of data in question, for example, data a₁ and data a₂, are located in the same address. In such a situation, a problem arises in that a bank conflict between the accesses to the main storage will occur, the access for the later data (for example, data a₂, if data a₁ is accessed with priority to data a₂) is delayed, and the efficiency of the access operation is deteriorated.

SUMMARY OF THE INVENTION

It is an object of the present invention to provide an improved vector access control system for a computer system using the indirect address access method, in which the frequency of the occurrence of a busy state in the access to a main storage is reduced, and the speed of access to a main memory is increased, so that the efficiency of the access operation is enhanced.

In accordance with the present invention, there is provided a vector access control system for a computer system including: a main storage; a memory control unit for controlling the main storage; and a vector unit including vector registers and a memory access pipeline function unit having an indirect address match checking circuit for detecting a coincidence between data of elements accessed by a plurality of indirect address data. An access to the main storage is carried out by adding plural data, which are read from the vector registers and are necessary for an indirect address access, to a leading address. When a coincidence of data of elements and the resultant conflict between access requests to the main storage is detected by the indirect address match checking circuit, only a predetermined access request in the conflicting access requests is allowed.

BRIEF DESCRIPTION OF THE DRAWINGS

FIGS. 1A, 1B, and 1C are diagrams illustrating a prior art vector access control system for a computer system;

FIG. 3 is a schematic diagram of the logic circuit in the indirect address match check circuit in the system of FIGS. 2A and 2B;

FIG. 5 illustrates the prohibition condition of the priority control circuit by the address match information in the system of FIGS. 2A and 2B;

FIG. 6 illustrates the operation of the system of FIG. 2A and 2B. de

DETAILED DESCRIPTION OF THE PREFERRED EMBODIMENTS

Figure 1A:
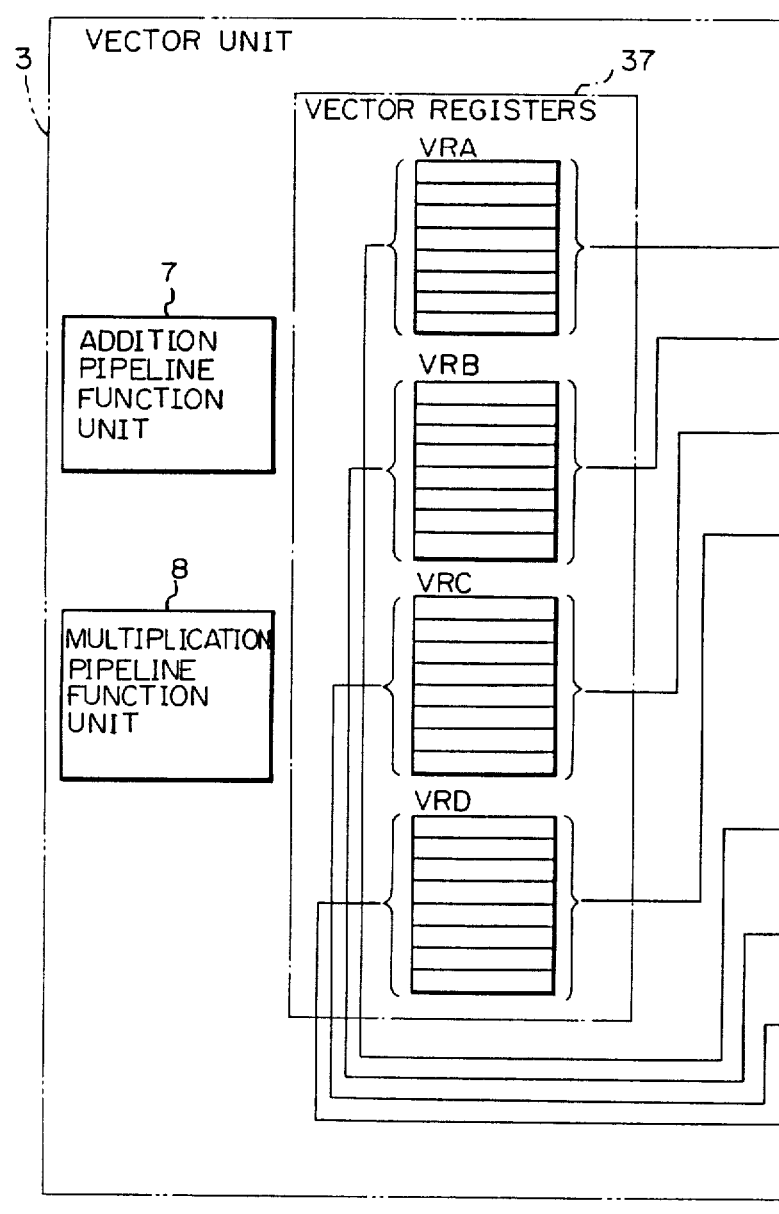

Before describing the preferred embodiments, a prior art vector access control system for a computer system will be described with reference to FIGS. 1A, 1B and 1C.

The prior art system includes a main storage unit 1; a memory control unit 2 having a priority control unit 21, error correction code circuits 22, ports PA to PJ, address buses AA, AB, AC, and AD, data buses DA, DB, DC, and DD; a vector unit 3 having a vector register portion 37, a memory access pipeline function unit 5, an instruction control portion 6, an addition pipeline function unit 7, and a multiplication pipeline function unit 8. The vector register portion 37 includes vector registers VRA to VRD. The memory access pipeline function unit 5 includes registers VRRA to VRRD, an address generation portion 33, and an access data processing portion 36. The ports PE and PF in the memory control unit 2 are connected to a central processor unit (CPU) and a channel processor (CHP). The instruction control portion 6 is also connected to a central processor unit (CPU).

In the memory control unit 2, the ports PA to PE receive access requests, and the ports PF to PJ carry out data input or output.

Figure 1C:
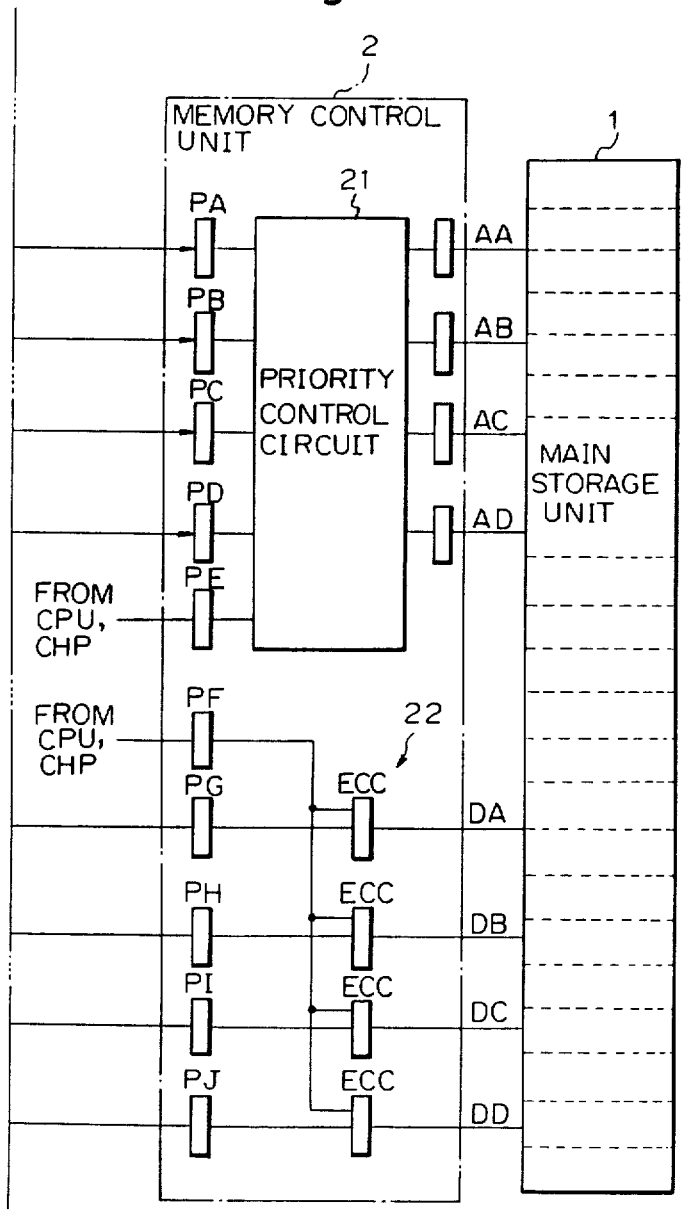

In the system of FIGS. 1A, 1B and 1C, the main storage unit 1 consists of a plurality of banks having an "interleaving" structure, and a plurality of ports are provided in the memory control unit 2. Accordingly, it is necessary to avoid the "busy" state of the main storage unit and conflict of the buses. In order to avoid the "busy" state of the main storage unit and conflict of the buses, the priority control circuit 21 is provided for determining an access request priority.

After the determination of the priority is carried out, the addresses for the access requests are supplied to the main storage unit 1 through a plurality of request address buses AA, AB, AC, and AD. For a store access operation, the operation of the main storage unit 1 is started by signals sent through the address buses AA, AB, AC, and AD, and corresponding data is then supplied to the memory control unit 2 through the data buses DA, DB, DC, and DD. For a load access operation, the operation of the main storage unit 1 is started by signals sent through the address buses AA, AB, AC, and AD, and the memory control unit 2 corrects the data received from the main storage unit 1, by the error correction code circuits 22, and transmits the data to the vector unit 3, the central processor unit CPU, or the channel processor CHP.

In the vector unit 3, the instruction control portion 6 decodes the received vector instructions from the central processor unit CPU, and then the operations of the addition pipeline function unit 7, the multiplication pipeline function unit 8, and the memory access pipeline function unit 5 are started, and thus predetermined corresponding processes are carried out. The memory access pipeline function unit 5 carries out the transmission processing between the vector registers 37 and the main storage unit, 1. A pipeline function unit such as a division pipeline function unit, may be provided to supplement the addition pipeline function unit 7 and the multiplication pipeline function unit 8.

In general, there are a number of styles of vector data patterns in a main storage unit 1: A first style is a pattern in which data are located in a contiguous area; a second style is a pattern in which data are arranged with a constant stride; and, a third style is a pattern in which data are arranged at random, which is known as an indirect address access method. In the system of FIGS. 1A, 1B and 1C and in the system according to the present invention, this third style of vector data patterns is adopted.

In the system of FIGS. 1A, 1B and 1C in which the indirect address access method is adopted, first a leading address is defined, and then the data difference between the leading address and addresses of the data located at random in the main storage unit 1, that is the index data, is registered as the indirect address data per element of vector data in the vector registers VRA to VRD.

In the execution of the instruction, each of the indirect address data for the elements read from the vector register i added to a leading address instructed by the instruction control portion 6, and the access processing to the main storage unit 1 is carried out.

In the vector registers VRA to VRD, the data corresponding to the elements are registered. For example, in the vector register VRA, the data of the elements having element number 4n, where n=0, 1, 2, ..., are registered, and in the vector register VRB, the data of the elements having element number 4n+1, where n=0, 1, 2, ..., are registered.

As described before, it is assumed that vector data access requests with the indirect address method are simultaneously carried out by using a plurality of indirect addresses, for example, 4 indirect addresses in a main storage having the bank structure of, for example, 256 banks. The vector data are located at random in the main storage unit 1, and therefore, a situation can occur in which a plurality of data in question, for example data $a_1$ and data $a_2$, are located in the same address. In such a situation, a problem arises in that a bank conflict occurs between the accesses to the main storage, and the access for the later data (for example, data $a_2$, if data $a_1$ is accessed with priority to data $a_2$) is delayed, and accordingly, the efficiency of the access operation is deteriorated.

Figure 2A:
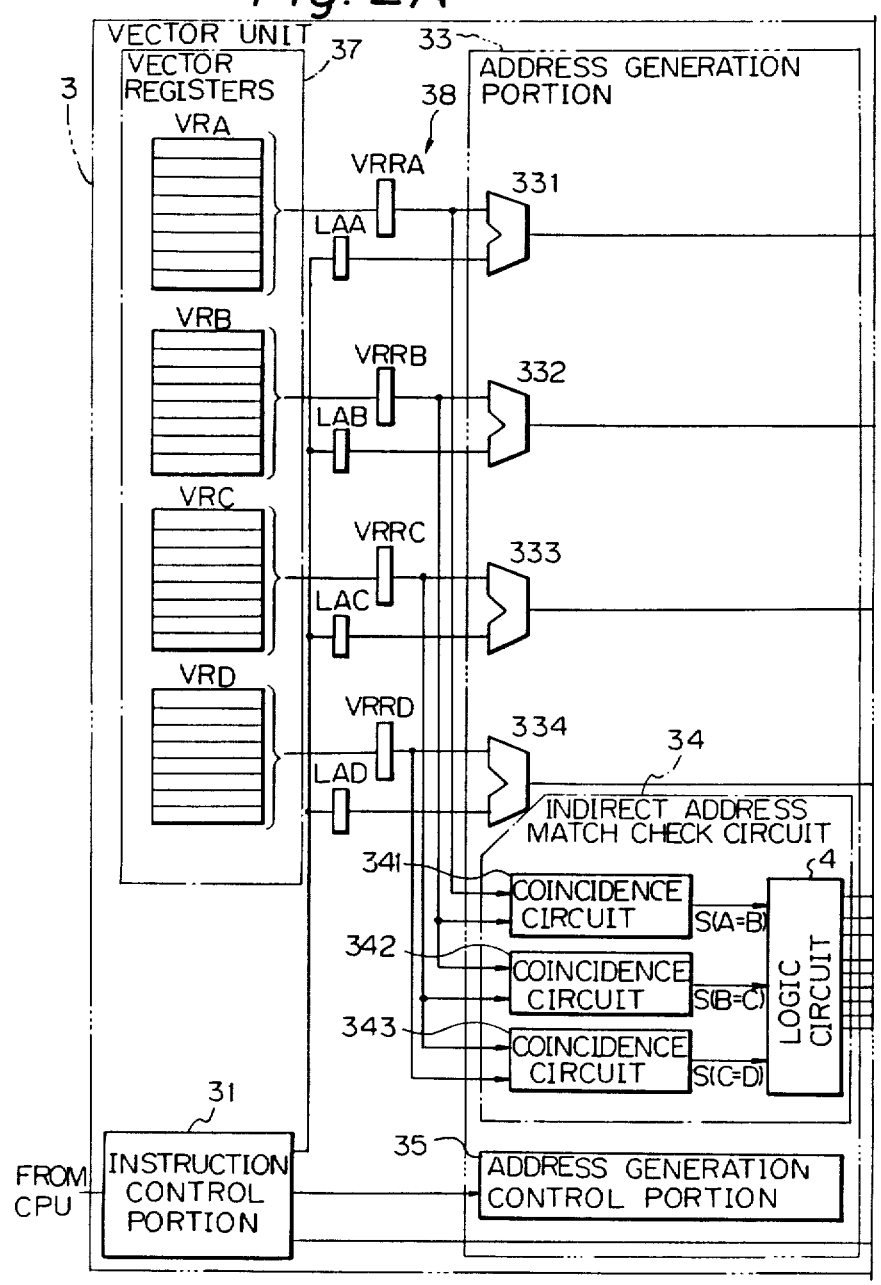
FIGS. 2A and 2B are schematic diagrams of a vector access control system for a computer system according to an embodiment of the present invention.
Figure 2B:
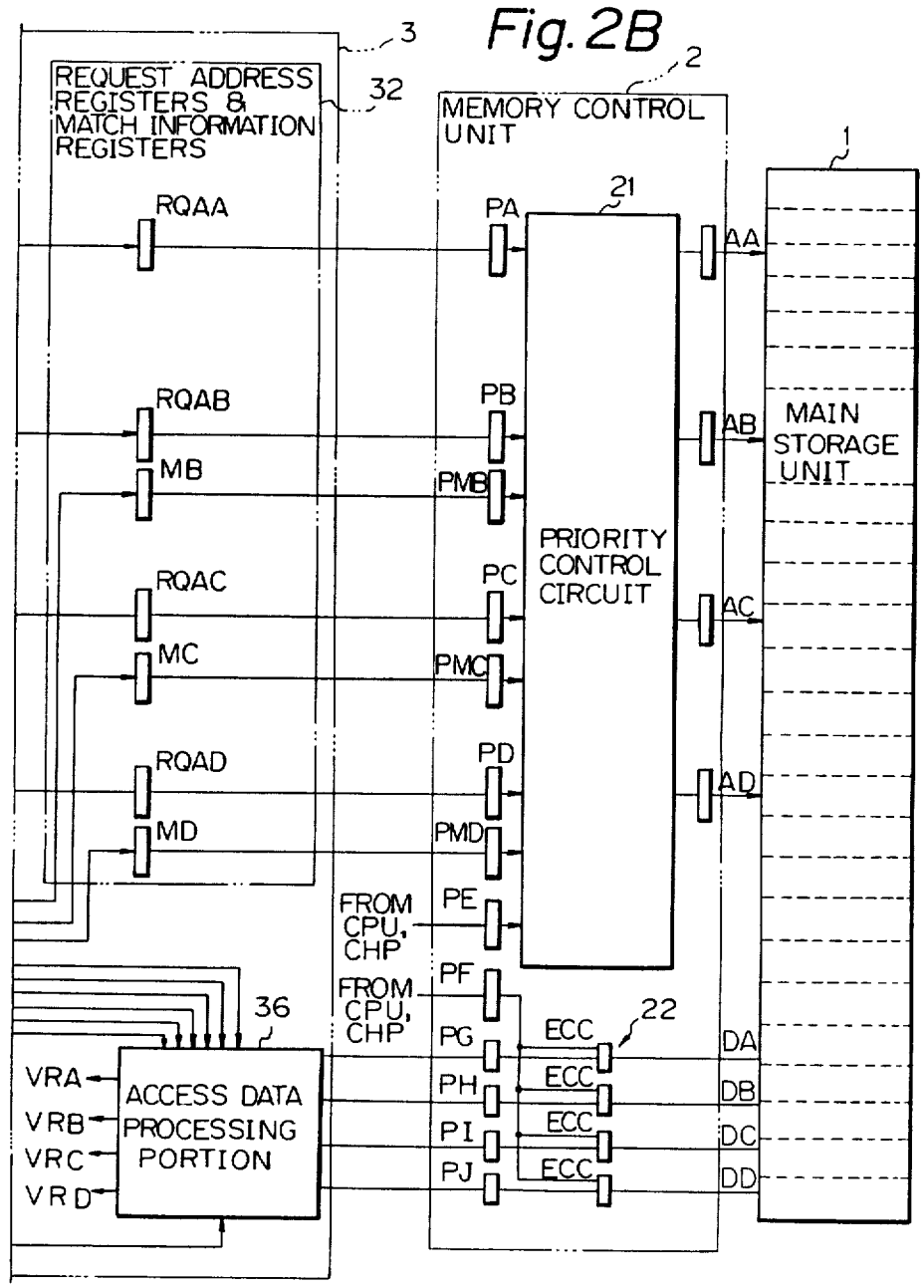

A vector access control system according to an embodiment of the present invention is shown in FIGS. 2A and 2B. This system includes a main storage unit 1; a memory control unit 2 having a priority control unit 21, ports PA to PJ, and error correction code circuits 22; and a vector unit 3 having an instruction control portion 31, request address registers and match information registers 32, an address generation portion 33 having adders 331 to 334, an indirect address match check circuit 34, an address generation control portion 35, an access data processing portion 36, a vector register portion 37, and reading and holding registers 38. The main storage unit 1 and the memory control unit 2 are connected through request address buses AA, AB, AC, and AD and data buses DA, DB, DC, and DD. The vector register portion 37 consists of vector registers VRA, VRB, VRC, and VRD. The ports PA, PB, PC, and PD in the memory control unit 2 receive access requests from the request address registers RQAA, RQAB, RQAC, and RQAD, and the ports PMB, PMC, and PMD in the memory control unit 2 receive access requests from the match information registers MB, MC, and MD.

The instruction control portion 31 is connected with a central processor unit CPU. The ports PE and PF in the memory control unit CPU 2 are connected with the central processor unit CPU and a channel processor CHP.

Reading registers VRRA to VRRD for reading indirect address data and holding registers LAA to LAD for holding leading addresses are provided between the vector register portion 37 and the adders 331 to 334. The same data is supplied from the instruction control portion 31 to the holding registers LAA to LAD.

Each of the adders 331 to 334 adds a leading address and an indirect address data.

In the system of FIGS. 2A and 2B, the address generating portion 33 and the request address registers and match information registers 32 constitute a memory access pipeline function unit.

In the reading registers and the holding registers 38 in the system of FIGS. 2A and 2B, VRRA to VRRD are registers for reading indirect address data, and LAA to LAD are registers for holding leading addresses LA supplied from the instruction control portion 31. The same data is supplied to the holding registers LAA to LAD. Each of the adders 331 to 334 carries out the addition of a leading address and an indirect address. The request address registers and match information registers 32 include request address registers RQAA, RQAB, RQAC, and RQAD for reading indirect address data and match information registers MB, MC, and MD.

A pipeline start signal (START), a vector length signal (VL), and an instruction operation code signal (EOP), and the like, which are necessary for the memory access pipeline function, are supplied from the instruction control portion 31 to the address generation control portion 35 so that operations represented by EOP having lengths represented by VL are carried out in sequence according to the order of the elements.

The match information registers MB, MC, and MD supply match information to the memory control unit 2. The priority control circuit 21 prohibits a plurality of the same access requests, except for the first access request in a plurality of the same read access requests, by using the match information supplied by the match information registers MB, MC, and MD.

For "store" access, only the data of the last access request plurality of suppressed access requests is transmitted from the access data processing portion 36 to the memory control unit 2, using the match information. For suppressed "load" access requests the data supplied from the memory control unit 2 is distributed to the suppressed access requests by the access data processing portion 36, using the match information.

The indirect address match check circuit 34 includes coincidence circuits 341, 342, and 343, and a logic circuit 4. The structure of the logic circuit 4 is shown in FIG. 3. In the indirect address match check circuit 34, the existence of a coincidence between four indirect address data delivered from the reading registers VRRA to VRRD is detected. The match information obtained as the result of this detection is supplied to the access data processing portion 36 and the priority control circuit 21 in the memory control unit 2.

The logic circuit 4 shown in FIG. 3 includes inverters 411, 412, and 413, AND gates 421, 422, 423, 424, and 425, and OR gates 431 and 432.

Figure 4:
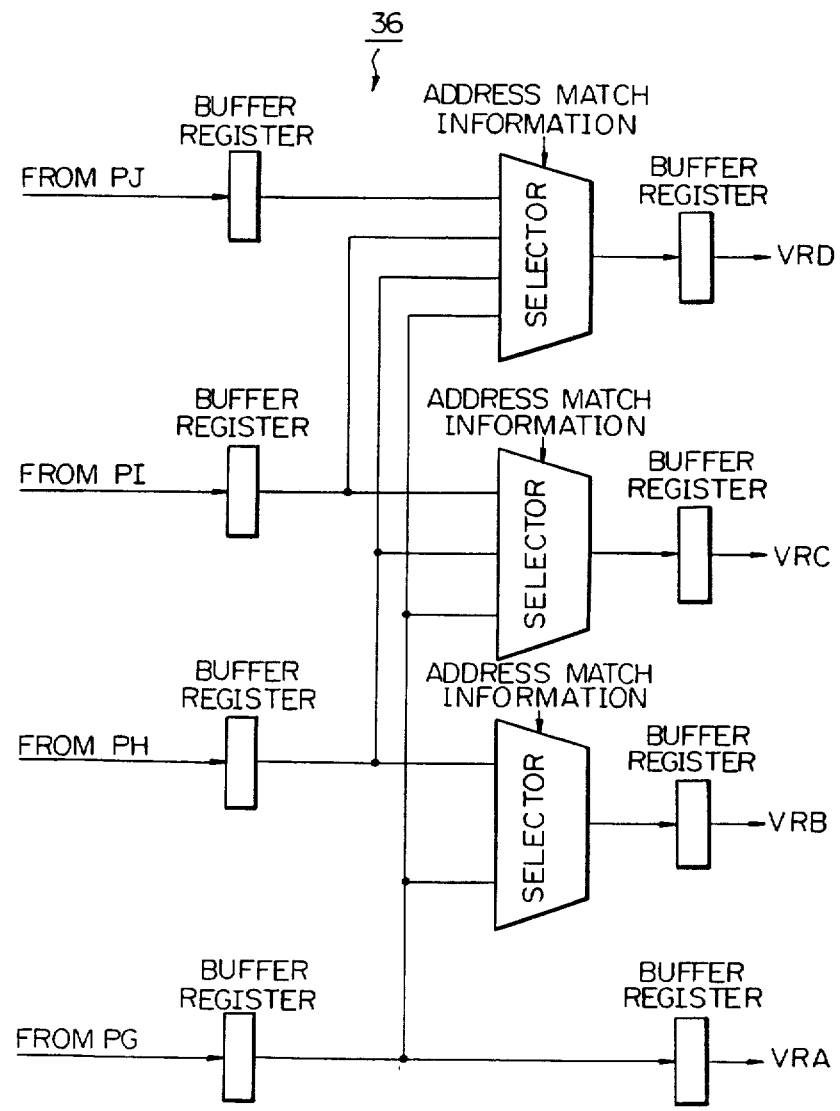
FIG. 4 is a diagram of the access data control portion in the system of FIGS. 2A and 2B.

The structure of the access data processing portion 36 is shown in FIG. 4. The access data processing portion 36 includes input buffer registers, selectors, and output buffer registers. The input registers receive data from the registers PG to PJ in the error correction code circuits 22 in the memory control unit 2. The selectors are controlled by the address match information MCH (A=B), MCH (A=C), MCH (B=C), MCH (A=D), MCH (B=D), and MCH (C=D) from the logic circuit 4 in the indirect address match check circuit 34. The signals from the output buffer registers are transmitted to the vector registers VRA to VRD.

In the coincidence circuits 341, 342, and 343, the coincidence between the VRRA data and VRRB data; VRRB data and VRRC data; or VRRC data and VRRD data is checked. When the coincidence is detected, a coincidence signal S (A=B), S (B=C), or S (C=D) is delivered from the coincidence circuit 341, 342, or 343.

In the logic circuit 4 of FIG. 3, predetermined relationships between data of the reading registers VRRA to VRRD are checked.

The signal S (A=B) indicating a coincidence between VRRA and VRRB is transmitted to the match information register MB; the signal S (A=B=C) or the signal S (A≠B=C) is transmitted to the match information register MC; and the signal S (A=B=C=D), S (A≠B=C=D), or S (B≠C=D) is transmitted to the match information register MD. Also, the signals S (A=B), S (A=B=C), S (A≠B=C), S (A=B=C=D), S (A≠B=C=D), and S (B≠C=D) are transmitted to the access data processing portion 36 to be used as control signals for the selectors.

In the priority control circuit 21, prohibition of the request signals from the vector unit is carried out by the address match information MB, MC, and MD in accordance with the condition indicated in FIG. 5. For a "load" state, PB, PC, and PD requests are prohibited in correspondence with an "ON" state of MB, MC, and MD. For a "store" state, PA, PB, and PC requests are prohibited in correspondence with an "ON" state of MB, MC, and MD.

The operation of the system of FIGS. 2A, 2B and 2C is explained with reference to FIG. 6. In FIG. 6, the first column indicates a timing sequence 1, 2, and 3; the second column indicates the state of the reading registers VRRA to VRRD; the third column indicates the element number; the fourth column indicates the result of the match check by the indirect address match check circuit 34; the fifth column indicates the processing in the access data processing portion 36 for a "load" access; and the sixth column indicates the processing in the access data processing portion 36 for a "store" access.

An example of the operation will be explained with reference to FIG. 6. At the timing 2, the condition is as follows:

$VRRA = a_1, VRRB = a_2, VRRC = a_2, VRRD = a_2$

In the indirect address match check circuit 34, the state of the signals is as follows:

| | |
|---|---|
| S (A = B) = 0 | S (A = B = C) = 0 |
| S (A ≠ B = C) = 1 | S (A = B = C = D) = 0 |
| S (A ≠ B = C = D) = 1 | S (B ≠ C = D) = 0 |

This shows that the data in the main storage which is requested by element No. 6 coincides with the data in the main storage which is requested by element No. 5. Accordingly, for a "load access", the data of element No. 5 is transmitted to the vector register. Similarly, with regard to element No. 7, the data of element No. 5 is also transmitted to the vector register.

Although certain preferred embodiments have been shown and described, it should be understood that many changes and modifications may be made therein without departing from the scope of the appended claims.

We claim:

1. A vector access control system for a computer system, said vector access control system comprising:
   a main storage;
   a memory control unit for controlling said main storage; and
   a vector unit, including vector registers and a memory access pipeline function unit having an indirect address match checking circuit for detecting a coincidence between addresses of elements of vectors accessed by a plurality of indirect address information, each of the addresses being an indirect address value equal to a value read from one of said vector registers plus a leading address having an integer value,
   wherein an access to said main storage is carried out by adding a plurality of data, which are read from said vector registers and are necessary for an indirect address access, to a leading address, and
   wherein, when a coincidence of addresses of elements and a resultant conflict between access requests to the main storage is detected by said indirect address match checking circuit, only a predetermined access request in said conflicting access requests is allowed, other access requests conflicting therewith being treated as having completed execution.

2. A vector access control system according to claim 1, wherein said predetermined access request is a first access request in said conflicting access requests when a load operation of said main storage is requested, data read upon execution of the first access request being supplied as read data for the other access requests conflicting therewith;

3. A vector access control system according to claim 1, wherein said predetermined access request is a last access request in said conflicting access requests when a store operation of said main storage is requested, the other access requests conflicting therewith being treated as having completed execution without any other store operation being executed.

4. A vector access control system according to claim 1,
wherein said vector unit further comprises means for generating accesses of said main storage for a plurality of vector elements simultaneously in parallel,
wherein accesses for vector elements in one of the vectors are executed in order of vector element number,
wherein upon detection of the resultant conflict between access requests for elements of the same vector, if the conflicting access requests are for a load operation, only the access request for a smallest conflicting vector element number is executed and read data resulting therefrom is supplied as data in response to all of the conflicting access requests and if the conflicting access requests are for a store operation, the access requests for a largest vector element number is executed to store data in said main storage corresponding to all of the conflicting access requests.

5. A vector access control system according to claim 1, wherein said indirect address match checking circuit compares a plurality of indirect address information read from said vector registers to detect the coincidence between the addresses of elements of vectors.

* * * * *